(12) United States Patent
Coveley

(10) Patent No.: US 6,725,206 B1
(45) Date of Patent: Apr. 20, 2004

(54) CASHIERLESS SHOPPING STORE AND COMPONENTS FOR USE THEREIN

(75) Inventor: Michael Coveley, Richmond Hill (CA)

(73) Assignee: Solbyung Coveley, Toronto (CA)

( * ) Notice: Subject to any disclaimer, the term of this patent is extended or adjusted under 35 U.S.C. 154(b) by 0 days.

(21) Appl. No.: 09/410,804

(22) Filed: Oct. 1, 1999

Related U.S. Application Data

(63) Continuation of application No. PCT/CA98/00280, filed on Apr. 1, 1998.

(30) Foreign Application Priority Data

Apr. 1, 1997 (CA) .............................................. 2201423

(51) Int. Cl.[7] .............................................. G06F 17/60
(52) U.S. Cl. ...................... 705/414; 177/17; 177/25.11; 340/568.5; 340/666; 340/870.07; 705/16; 705/400
(58) Field of Search .......................... 177/15, 17, 25.11, 177/25.15; 340/568.5, 666, 870.07; 705/16, 400, 414

(56) References Cited

U.S. PATENT DOCUMENTS

| 3,749,191 A | 7/1973 | Ashen et al. .................. 177/1 |
| 4,373,133 A | 2/1983 | Clyne et al. ................ 235/383 |

FOREIGN PATENT DOCUMENTS

| EP | 0 654 477 A2 | 5/1995 |
| JP | 02309494 | 12/1990 |
| WO | WO 91/19961 | 12/1992 |
| WO | WO 96/26505 | 8/1996 |
| WO | WO 9/44462 | * 10/1998 |

OTHER PUBLICATIONS

Luken et al: "Pilot program helps weigh options for weight–based billing"; World Wastes, Dec. 1994, vol. 37, No. 12, pp. 40–42.*

"Grocery Buggy", IBM Technical Disclosure Bulletin, Nov. 1988, US, vol. 31, NR. 6, pp. 399–400.

* cited by examiner

Primary Examiner—Edward R. Cosimano
(74) Attorney, Agent, or Firm—Baker & Daniels

(57) ABSTRACT

A cashierless shopping store includes a plurality of shopping carts into which selected items to be purchased are placed by shoppers. Each of the shopping carts includes a weight detector to measure the weight of items placed therein and a transmitter to transmit the measured weights over a wireless communications link. A portable wireless shopping terminal accompanies each of the shopping carts. Each shopping terminal reads item price and item weight data from each selected item to be purchased and receives the measured weight of each selected item transmitted over the wireless communication link by the transmitter. The shopping terminal compares the read item weight data with the transmitted measured weight to determine if the read item weight data and the transmitted measured weight for each selected item correlate. At least one checkout station is provided and includes a scale to measure the total weight of selected items in a shopping cart and a transmitter to transmit the measured total weight over the wireless communications link to the shopping terminal accompanying that shopping cart. The shopping terminal compares the measured total weight with the sum of the read item weight data to determine if the weights correlate.

19 Claims, 10 Drawing Sheets

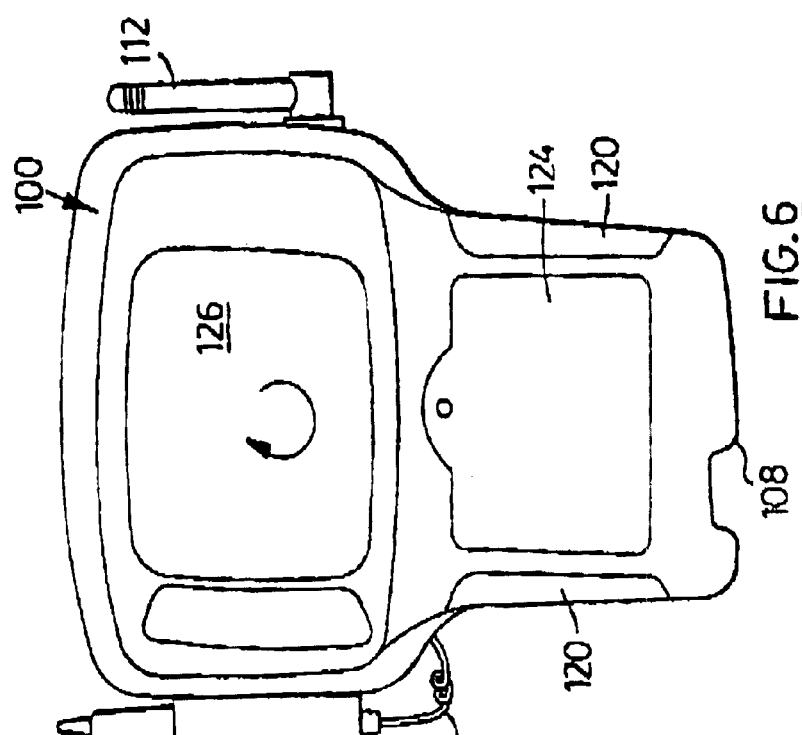
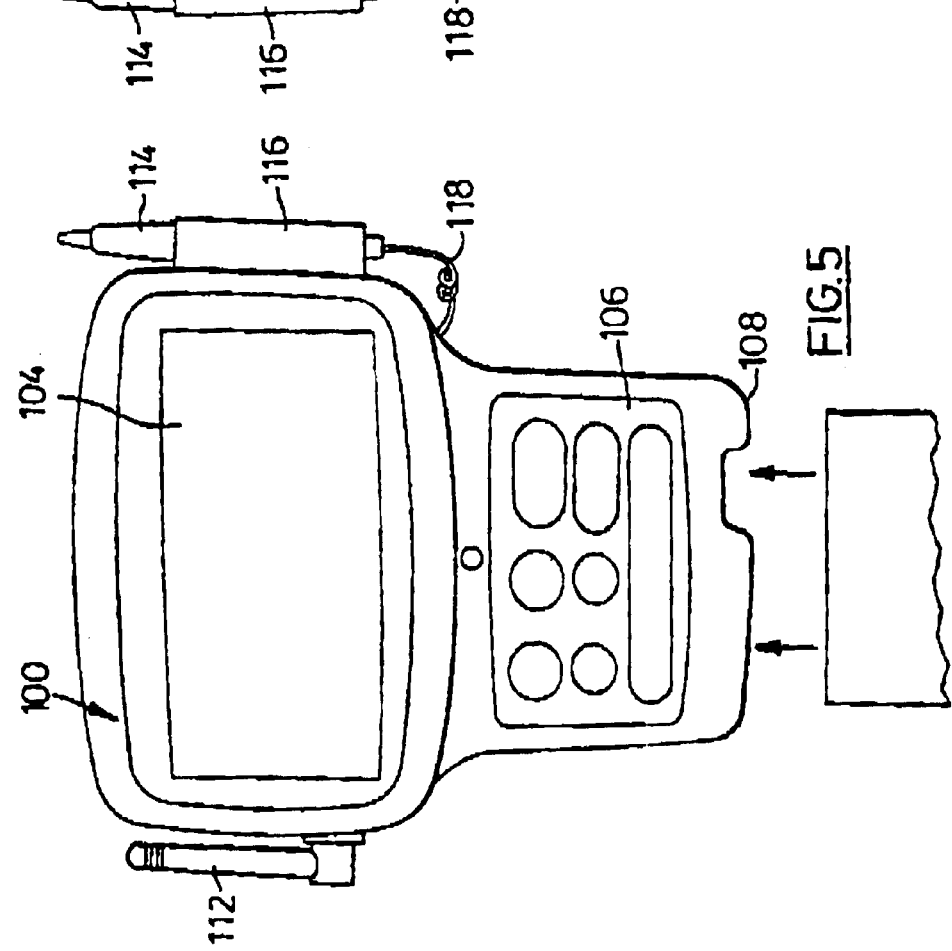

CASHIERLESS SHOPPING STORE AND
COMPONENTS FOR USE THEREIN

This is a continuation of the International Application Serial No. PCT/CA/9800280, which designated the United States, filed Apr. 1, 1998.

TECHNICAL FIELD

The present invention relates to shopping stores an in particular to a cashierless shopping store and components for use therein.

BACKGROUND ART

Grocery shopping is a task performed by virtually every household at least on a weekly basis but unfortunately can be time consuming and frustrating. When grocery shopping, a shopper typically obtains a cart and then proceeds to walk along the various aisles in the grocery store looking for items on the shelves to be purchased. As a shopper selects items from the shelves, the items are placed or tossed into the basket of the shopping cart.

Once the shopper has finished shopping, the shopper proceeds to a checkout counter. At the checkout counter, the shopper must unload the items in the basket of the shopping cart and place the items on a conveyor belt. A cashier at the checkout counter controls movement of the conveyor belt to bring the items towards a cash register and/or a bar code scanner. The cashier then either enters the price or price code of each item into the cash register or scans the bar code on each item via the bar code scanner and then places the items in disposable plastic or paper bags. Once all of the items have been processed and bagged, the cashier totals the purchased items so that the shopper can pay for them. After payment has been made, the shopper can leave the grocery store with the bags of purchased items.

Unfortunately, this method of shopping has several drawbacks. In particular, when the shopper is walking the aisles looking for items, the items to be purchased are placed or tossed into the basket of the shopping cart as the items are taken from the shelves. This often results in perishable or breakable items being damaged by later selected items that are placed or tossed into the basket of the shopping cart. Also, items placed or tossed into the basket must be unloaded by the shopper at the checkout counter and then placed in bags by the cashier. Since the items must be handled several times, the time needed to complete shopping and the risk of damage to the items is increased.

This method of shopping also suffers drawbacks which affect the grocery store owner. In particular, it is possible for an individual to fill a shopping cart with items and then wheel the shopping cart through an un-manned checkout counter without paying for the items. Also, an individual may switch price tags on items so that a lesser charge is paid for the items. Furthermore, in grocery stores where cashiers must enter item prices or price codes, errors may be made and incorrect amounts charged to the shoppers.

In addition to the above-mentioned drawbacks, the use of disposable plastic or paper bags to hold purchased items results in significant waste typically disposed of via landfill. As will be appreciated, improvements to the shopping process are desired.

It is therefore an object of the present invention to provide a novel cashierless shopping store and components for use therein.

SUMMARY OF THE INVENTION

Broadly stated the present invention provides a cashierless shopping store including portable RF shopping terminals carried by shoppers. Bar codes on purchased items are scanned using an RF shopping terminal before being placed in a shopping cart. The shopping cart detects the weight of items placed therein and conveys the weight information to the RF shopping terminal over an RF communications link. The RF shopping terminal compares the weight information received from the shopping cart with the weight information read from the bar codes. If the weight information does not correlate, the RF shopping terminal signals a controller to activate an alarm. When the shopper wishes to pay for the selected items, the shopping cart is wheeled to a cashierless checkout station. A lifting unit lifts the shopping cart to detect the weight of the purchased items and conveys the weight information to the RF shopping terminal. The RF shopping terminal again compares the weight information received from the lifting unit with the total weight information read from the scanned bar codes. If the weight information correlates, the RF shopping terminal prompts the shopper to enter a debit, credit or smart card into a card reader therein. Once the card is read, the RF shopping terminal prompts the shopper to enter a PIN or password and then generates a financial transaction request. The financial transaction request is conveyed to a network controller over an RF communication link. The network controller in turn conveys the financial transaction request to a financial institution for verification and processing. Once processed and verified, a verification is transmitted back to the network controller which in turn signals a printer to print a receipt and open a gate allowing the shopper to leave with the purchased items.

According to one aspect of the present invention there is provided a cashierless shopping store comprising:

at least one shopping cart into which items to be purchased are placed, said at least one shopping cart including means to detect the weight of items placed therein and means to transmit detected item weight information over a wireless communication link;

at least one portable wireless shopping terminal to accompany said at least one shopping cart and receiving item price and weight information read from items to be purchased prior to placement in said shopping cart, said at least one shopping terminal also receiving the weight information transmitted over said wireless communication link and comparing the read item and transmitted weight information to determine if said weights correlate; and at least one checkout station including means to detect the total weight of items in said at least one shopping cart and means to transmit detected total weight information over said wireless communication link to said at least one shopping terminal, said at least one shopping terminal comparing the transmitted total weight with the sum of read item weights to determine if said total and sum weights correlate.

According to another aspect of the present invention there is provided a method of shopping for items comprising the steps of:

scanning item price and weight information concerning items to be purchased;

placing scanned items into a shopping cart;

detecting the weight of each item as each item is placed in said shopping cart; and comparing the scanned weight information with the detected weight of items placed in said shopping cart to determine if said weights correlate.

In still yet another aspect of the present invention there is provided a shopping cart comprising:

a wheeled carriage; and a hopper on said carriage into which items to be purchased are placed, said hopper being partitioned into a plurality of compartments, each of said compartments for receiving a bag into which items may be placed during shopping.

The present invention provides advantages in that the cashierless shopping store allows a shopper to purchase items without the need for a cashier to handle and bag the purchased items. Thus, as the shopper shops, items to be purchased can be sorted and bagged by the shopper "on the go" avoiding item damage from occurring.

Also, the cashierless shopping store inhibits shoppers from leaving the shopping store without paying for items as well as inhibits shoppers from switching price tags on items.

BRIEF DESCRIPTION OF THE DRAWINGS

An embodiment of the present invention will now be described more fully with reference to the accompanying drawings in which:

FIG. 5 is a top plan view of the RF shopping terminal of FIG. 4;

FIG. 6 is a bottom plan view of the RF shopping terminal of FIG. 4;

BEST MODE FOR CARRYING OUT THE INVENTION

Figure 1:
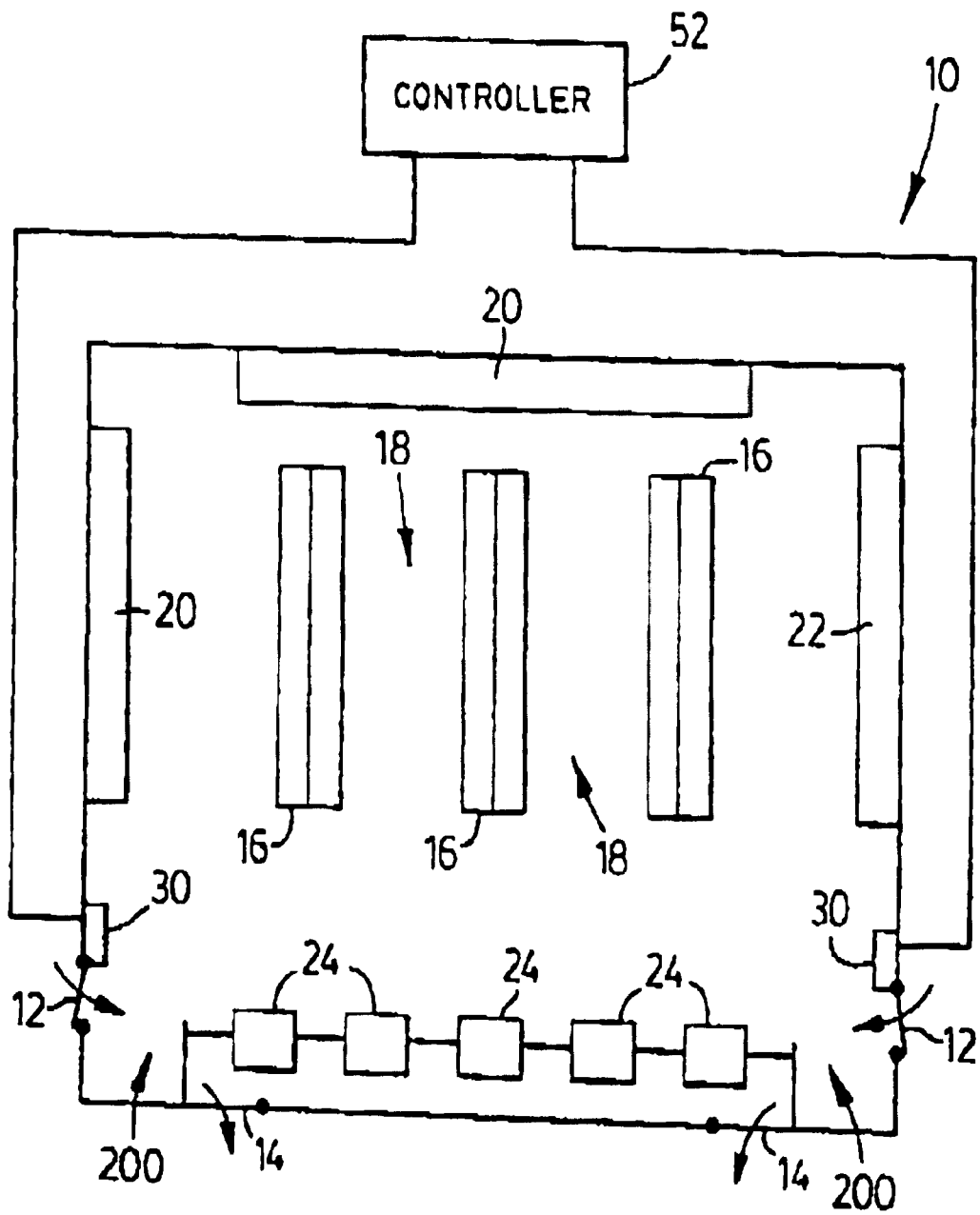
FIG. 1 is a schematic illustration of a cashierless shopping store in accordance with the present invention.

Referring now to FIG. 1, a cashierless shopping store is illustrated and is generally identified by reference numeral 10. The shopping store 10 includes two, one-way entrances 12 and two, one-way exits 14 to allow shoppers to enter and leave the shopping store. Within the shopping store are a plurality of spaced rows of shelving 16 defining aisles 18. Non-perishable items are placed on the shelving. Bordering the rows of shelving are freezers 20 and produce bins 22 holding perishable items such as meats, vegetables and fruits. As is well known, shoppers walk through the shopping store and select items to be purchased. A plurality of cashierless checkout stations 24 are also included in the shopping store 10 to allow shoppers to pay for selected items and exit the shopping store 10 by way of one of the exits 14.

Figure 2:
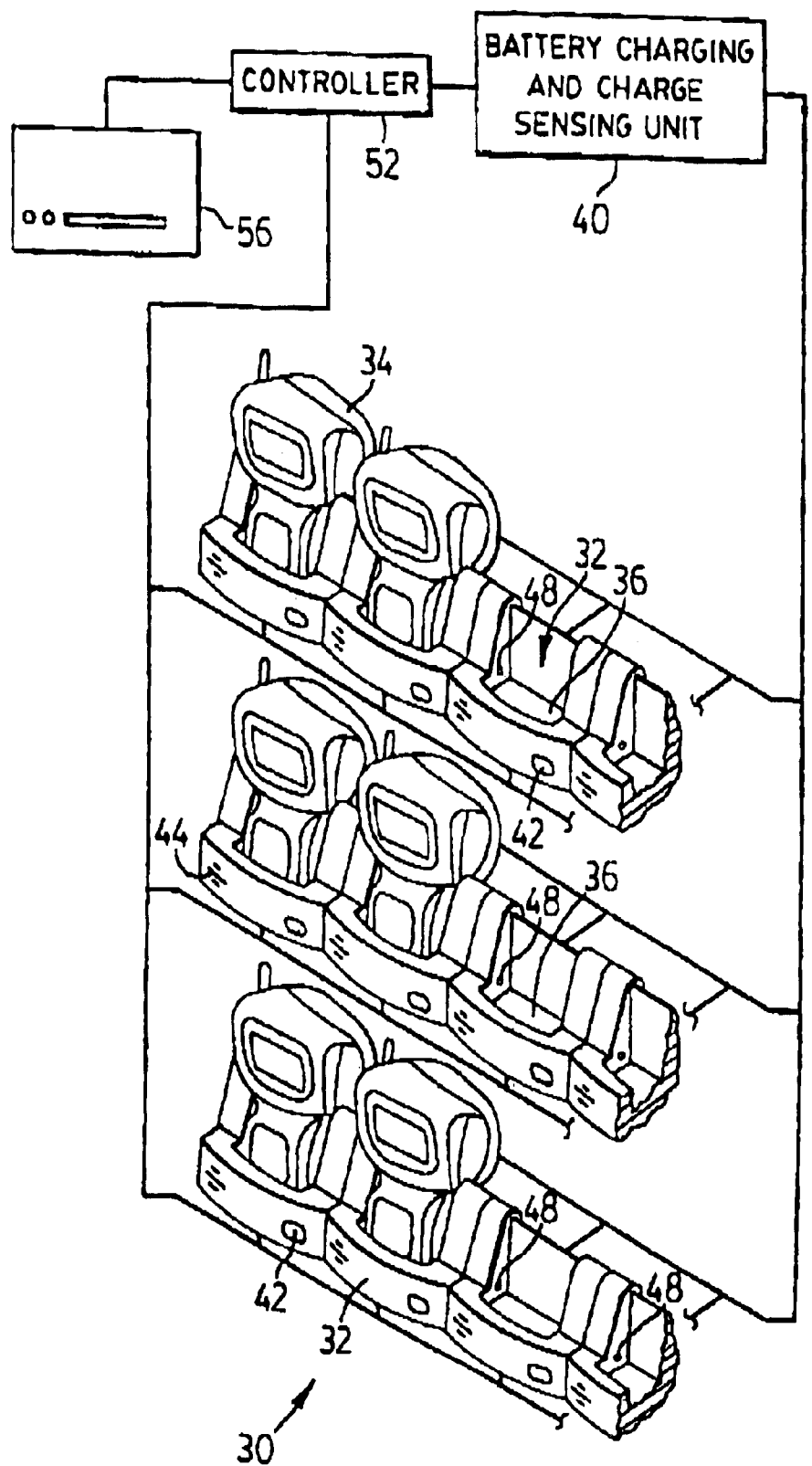
FIG. 2 is a perspective view of a radio frequency (RF) shopping terminal charging bank for charging radio frequency shopping terminals used in the cashierless shopping store of FIG. 1.
Figure 3:
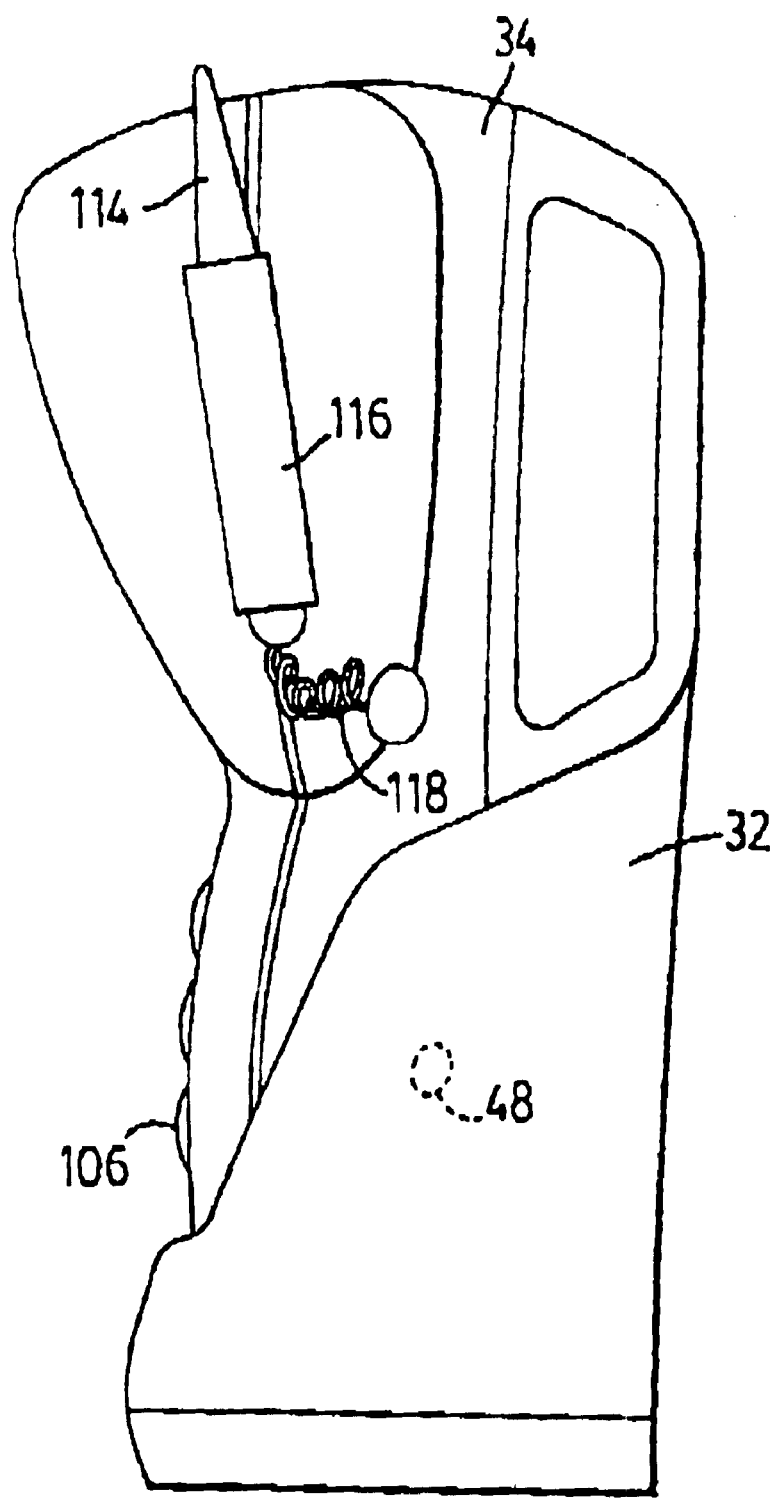
FIG. 3 is a side elevational view of one of the receptacles in the RF shopping terminal charging bank of FIG. 2.
Figure 4:
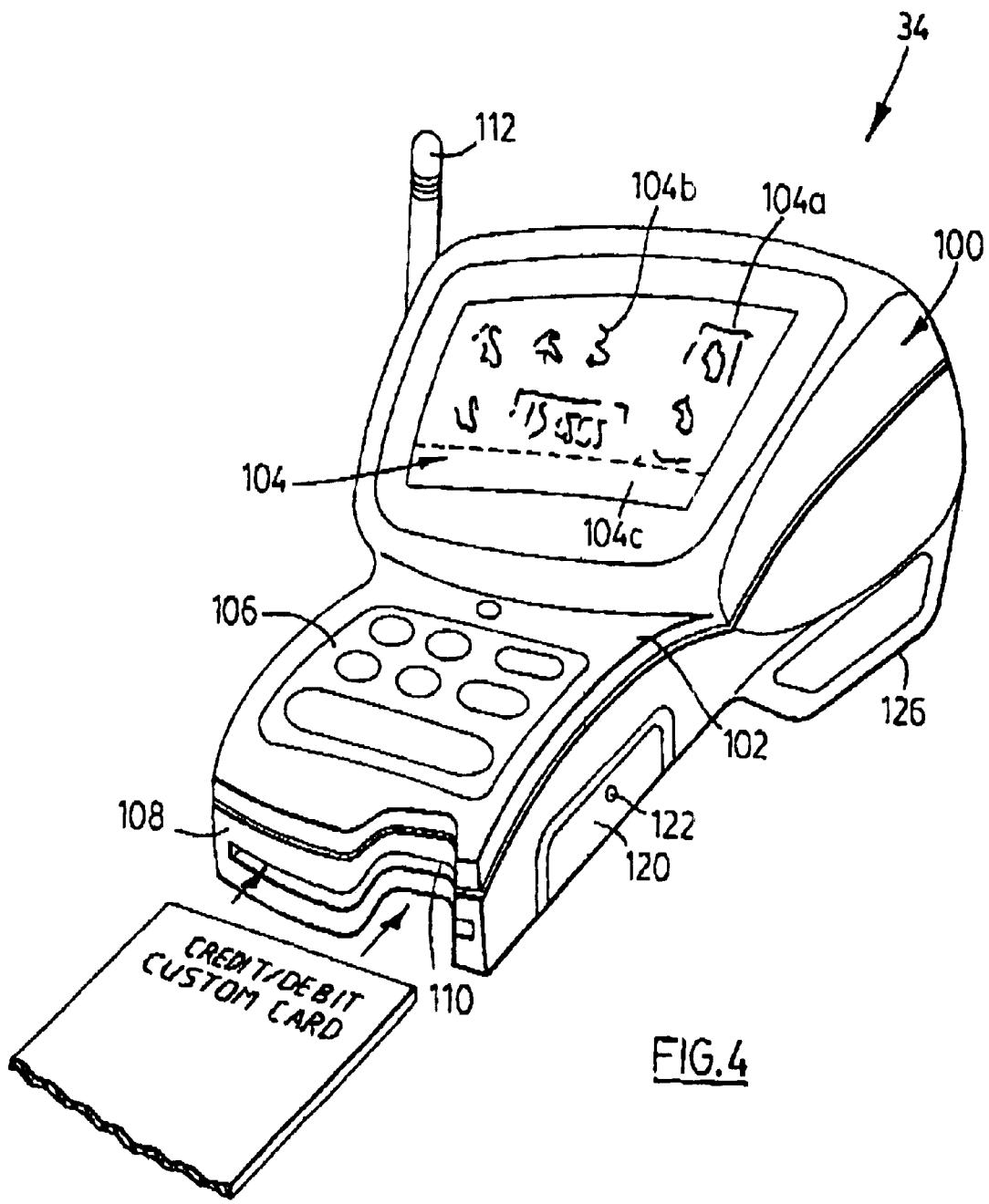
FIG. 4 is a perspective view of one of the RF shopping terminals illustrated in FIG. 3.

Positioned adjacent each entrance 12 is a radio frequency (RF) shopping terminal charging bank 30 (best seen in FIGS. 2 and 3). The RF shopping terminal charging bank 30 includes a plurality of rows of holders 32 each of which accommodates an RF shopping terminal 34. Each holder 32 has a pocket 36 into which an RF shopping terminal 34 is inserted. Electrical contacts (not shown) are located within each pocket 36 to establish an electrical connection between the RF shopping terminal accommodated thereby and a battery charging and charge sensing unit 40 connected to the holders 32. A flashing LED 42 and a sound generator 44 are housed within each holder 32. A locking mechanism is also housed by each holder 32 and includes a pair of retractable locking pins 48 which project into the pocket. The locking pins 48 are moveable between an extended position where they extend into the pocket 36 and a retracted position where they are positioned within sidewalls of the holder 32. The locking pins 48 are accommodated by holes in the RF shopping terminals 34 when in the extended position to inhibit the RF shopping terminals 34 from being removed from the pockets 36.

The battery charging unit 40 charges the batteries in the RF shopping terminals held in the pockets 36 and senses the charge held by the batteries. The battery charging and charge sensing unit 40 is connected to a controller 52 and conveys the sensed charged information to the controller 52 so that the RF shopping terminal 34 having the most charged battery can be detected. The controller 52 is also connected to each locking mechanism and is operable to condition selected locking mechanisms to retract the locking pins 48 to allow RF shopping terminals to be removed from their holders 32. A credit, debit or store honor card reader 56 is also connected to the controller 52 to allow the controller to detect the validity of a read card and whether the read card carries at least threshold level of available finds before a selected RF shopping terminal 34 is released.

Referring now to FIGS. 4 to 7, one of the RF shopping terminals 34 is better illustrated. As can be seen, the RF shopping terminal 34 includes a shock resistant housing 100 formed of butadene rubber having an upper surface 102 on which are located a display screen 104 and an input keypad 106. A card reader 108 is accommodated by the housing and has a card reading slot 110 accessible from one end of the housing. An RF antenna 112 is rotatably mounted on one side of the housing adjacent the display screen 104. A pointer 114 is removably held by a holder 116 on the opposite side of the housing and is attached to the housing 100 by a flexible helical coil 118.

The display screen 104 is partitioned and includes a touch-sensitive bill-board 104a to present visually, store specials, rewards and announcements as well as shopper selectable icons 104b to allow the shopper to complete financial transaction requests. The display screen 104 also includes a financial transaction display area 104c functionally divided into unsecured and secured display areas as will be described.

Locking plates 120 are provided on opposed sides of the housing 100 adjacent the keypad 106 and are accommodated by recesses therein. Springs (not shown) act between the housing and the locking plates 120 to bias the locking plates to an outer extent. The locking plates can however be pushed into the recesses against the bias of the springs. Each locking plate 120 has a hole 122 therein to receive a locking pin 48 as well as a locking pin on a shopping cart as will be described.

Figure 7:
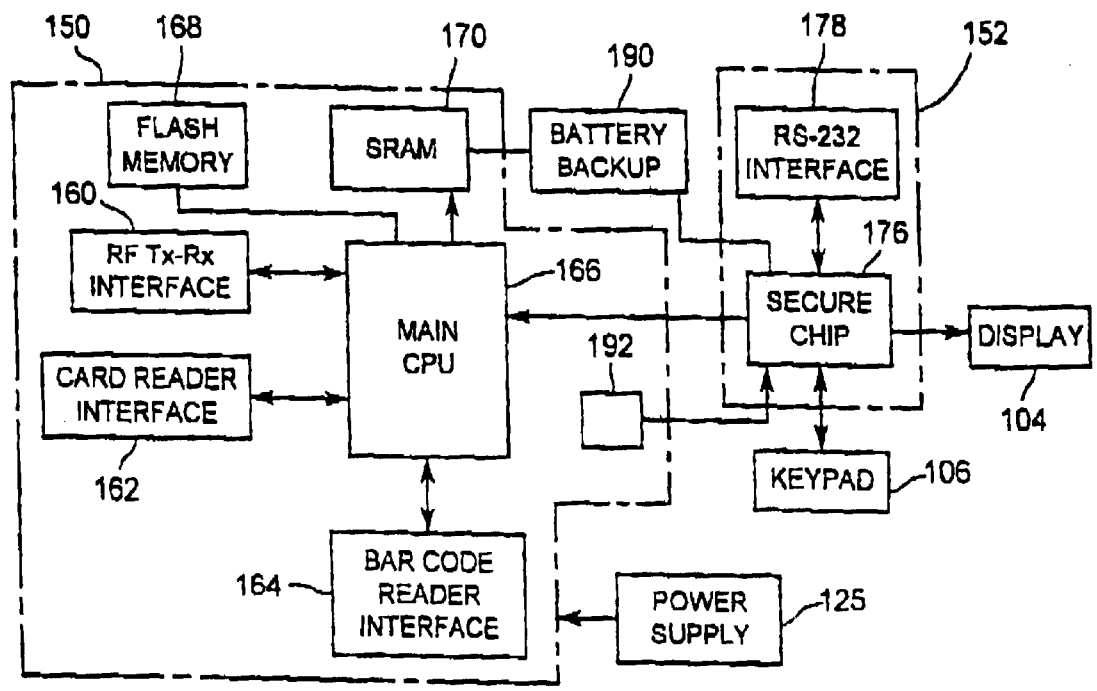
FIG. 7 is a schematic block diagram of the RF shopping terminal of FIG. 4.

On the back of the housing 100 behind the keypad 106 is a removable plate 124 behind which is located a rechargeable battery 125 (see FIG. 7). A rotatable laser bar code scanner 126 is positioned on the back of the housing above the plate 124. The laser bar code scanner 126 is rotatable between three detented positions to allow the direction in which bar codes on items to be purchased are to be scanned, to be selected by shoppers.

Within the RF shopping terminal 34 is a motherboard on which the internal electronic components of the RF shopping terminal are mounted. The internal electronic components are separated into a main module 150 and a secure module 152 for security reasons. The main module 150 includes a RF transmit-receive (Tx-Rx) interface 160, a card reader interface 162 and a laser bar code scanner interface 164. A main central processing unit (CPU) 166 is connected to the interfaces to control their operation. The RF Tx-Rx interface 160 is connected to an RF modem (not shown) which in turn is connected to the antenna 112. Flash memory 168 and static random access memory (SRAM) 170 are also connected to the CPU 166 and store start-up routines, interrupt handlers, I/O routines, applications programs etc.

Figure 8:
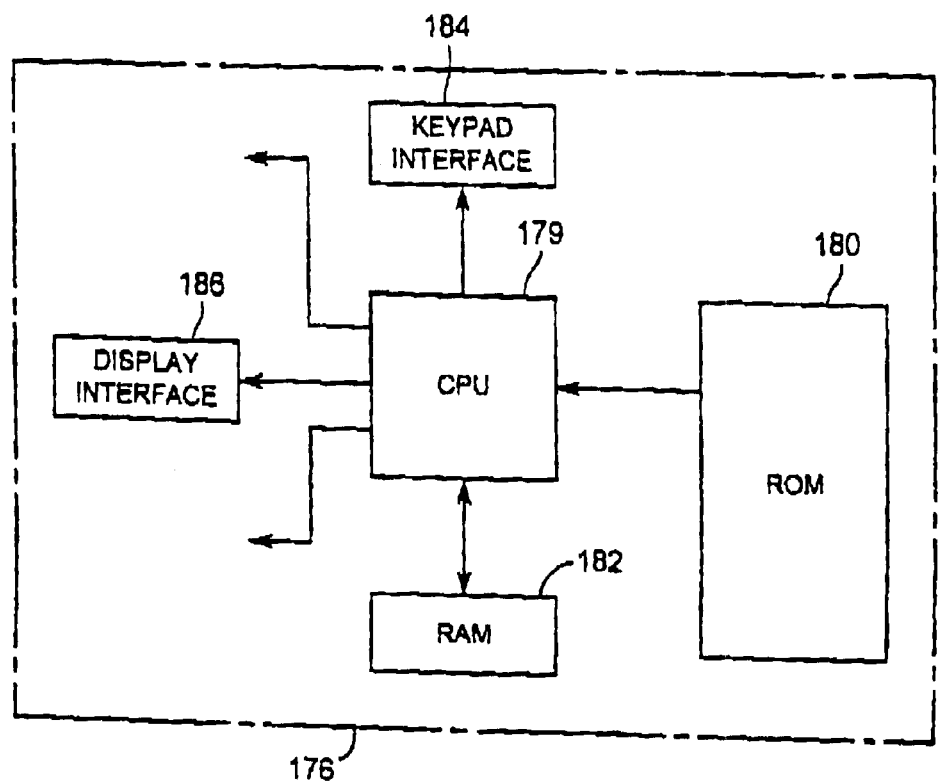
FIG. 8 is a schematic block diagram of a secure module forming part of the RF shopping terminal of FIG. 4.
Figure 9:
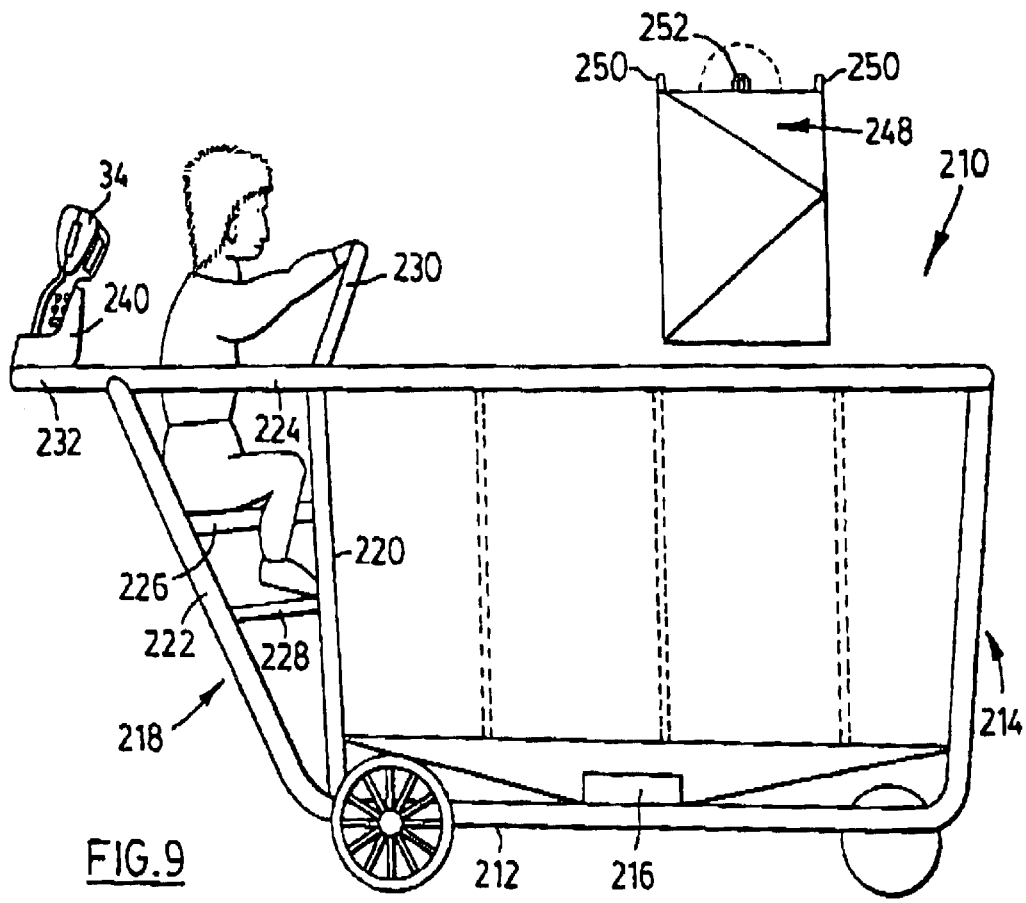
FIG. 9 is a side elevational view of a shopping cart used in the cashierless shopping store of FIG. 1.
Figure 10:
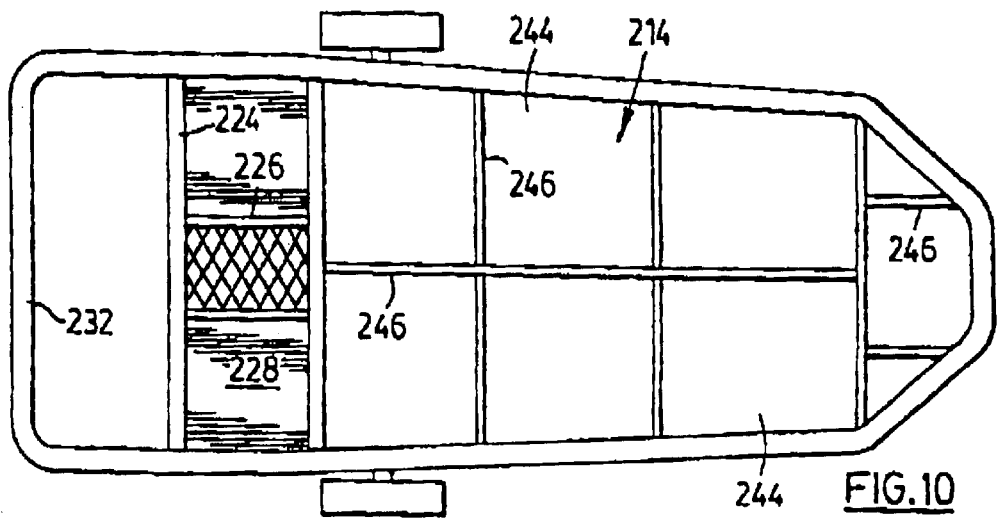
FIG. 10 is a top plan view of the shopping cart of FIG. 9.
Figure 11:
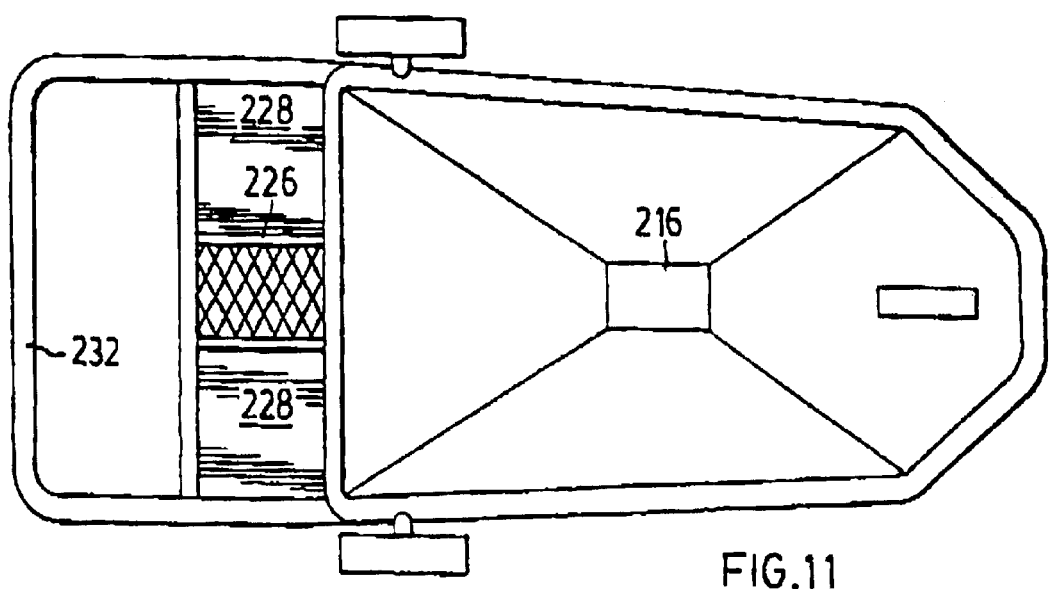
FIG. 11 is a bottom plan view of the shopping cart of FIG. 9.
Figure 12:
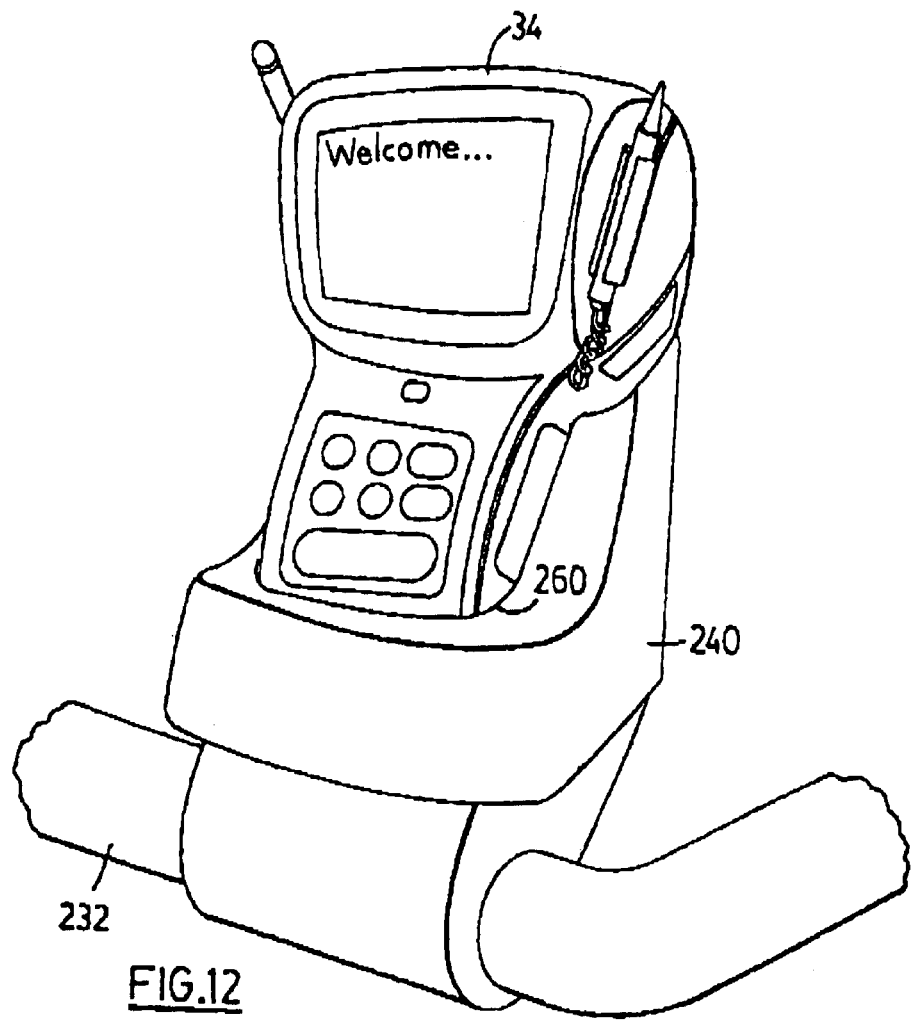
FIG. 12 is a perspective view of a portion of the shopping cart of FIG. 9 with a RF shopping terminal thereon.

The secure module 152 provides for cryptographic services and security to guard against software tampering that could result in card personal identification numbers (PIN) or passwords from being accessed. The secure module includes an encapsulated one-time programmable (OTP) secure integrated circuit (IC) device 176 and an auxiliary RS 232 interface 178. As shown in FIG. 8, the secure IC device includes a CPU 179, read only memory (ROM) 180, random access memory (RAM) 182 and keypad and display interfaces 184 and 186 respectively to allow the secure IC device 176 to control operation of the display and keypad. The ROM 180 stores a secure operating system comprising cryptographic security services, display and keypad control and communications control with the main module 150. The RAM 182 stores cryptographic keys and passwords and provides for operating system workspace.

The main and secure modules 150 and 152 receive power from the rechargeable battery 125 in the usual manner. A backup battery 190 is provided to protect against inadvertent power loss and consequent loss of data stored in SRAM 170 and RAM 182. A photosensor 192 is also provided on the motherboard and is connected to the secure IC device 176. If the integrity of the housing 100 is compromised and the interior of the housing exposed to light, the photosensor 192 triggers the secure IC 176 device to clear the cryptographic keys stored in RAM 182 thereby to inhibit an intruder from acquiring the cryptographic keys.

The controller 52 downloads product location information and special pricing information to the RF shopping terminals 34 via the RF communications link. This allows a shopper to enter their shopping list into the RF shopping terminal 34 via the touch-screen. The RF shopping terminal in turn sorts the shopping list into order based on aisle location. Also, the RF shopping terminal 34 can display special pricing information as a shopper walks through the various aisles.

Positioned adjacent each RF shopping terminal charging bank 30 is a grocery cart storage area 200 from which a shopper may take a shopping cart 210. FIGS. 9 to 12 best illustrate one of the shopping carts 210. As can be seen, the shopping cart 210 includes a wheeled undercarriage 212 on which a hopper 214 is disposed. The upper surface of the undercarriage is configured to inhibit lateral movement of the hopper 214 with respect to the undercarriage. A load cell 216 having an RF communications module therein is centrally positioned on the upper surface of the undercarriage 212 to detect the weight of the hopper 214. Extending upwardly from the undercarriage behind the hopper is a child support frame 218. Child support frame includes upright front posts 220 and rearwardly inclined back posts 222. The tops of the posts 220 and 222 are joined by a rectangular ring 224. Intermediate posts depend from the rectangular ring 224 between the front and back posts. A seat 226 and foot rests 228 extend between the intermediate posts and are welded to them. A play-panel 230 extends upwardly and forwardly of the arm of the ring 224 that spans the front posts 220. A curved handle 232 is secured to the arm of the ring 224 that spans the back posts 222. An RF shopping terminal holder 240 similar in configuration to the holders 32 is mounted on the handle 232.

The hopper 214 is divided into a plurality of compartments 244 by internal walls 246. The compartments 244 are designed to receive and retain polyvinyl, soft-walled, reusable bags 248. The bags 248 are generally rectangular in plan and include opposed handles 250 adjacent their upper rims. Each bag 248 also includes opposed retaining clasps 252 adjacent its upper rim to allow the bag to be clipped to the internal walls 246 defining a compartment and maintain the bag in an open condition.

The RF shopping terminal holder 240 includes a pocket 260 into which an RF shopping terminal 34 is inserted. Locking pins (not shown) are provided on the interior sidewalls of the holder and are positioned so that they are accommodated by the holes 122 in the locking plates 120 of an RF shopping terminal when the RF shopping terminal is inserted into the pocket 260. The sides of the holder are however shaped to provide access to the locking plates when the RF shopping terminal is in the pocket. In this manner, the locking plates 120 can be pushed into the recesses to move the holes beyond the locking pins and thereby allow the RF shopping terminal 34 to be lifted from the holder 240.

Figure 13:
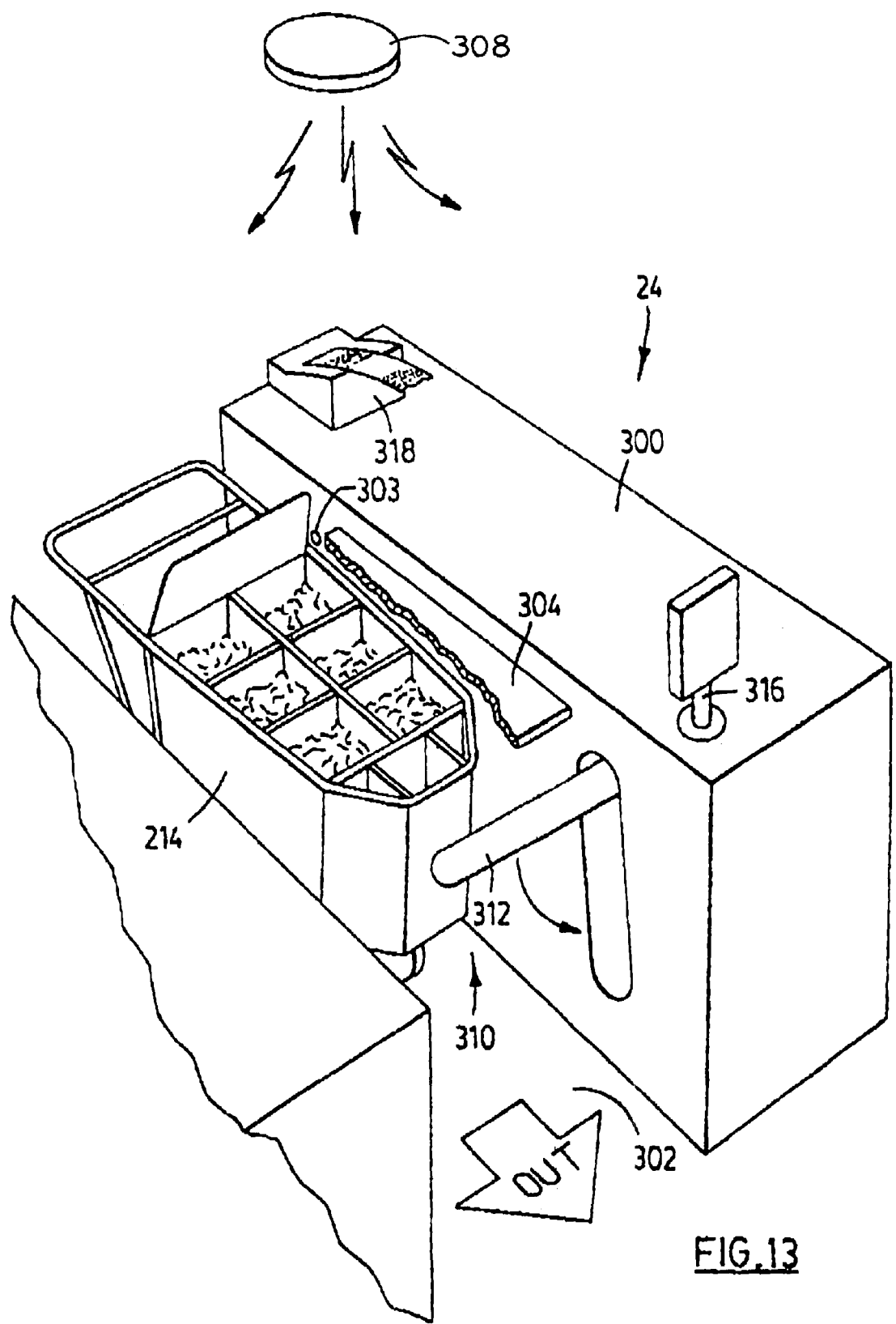
FIG. 13 is a perspective view of a cashierless checkout station forming part of the cashierless shopping store of FIG. 1.
Figure 14:
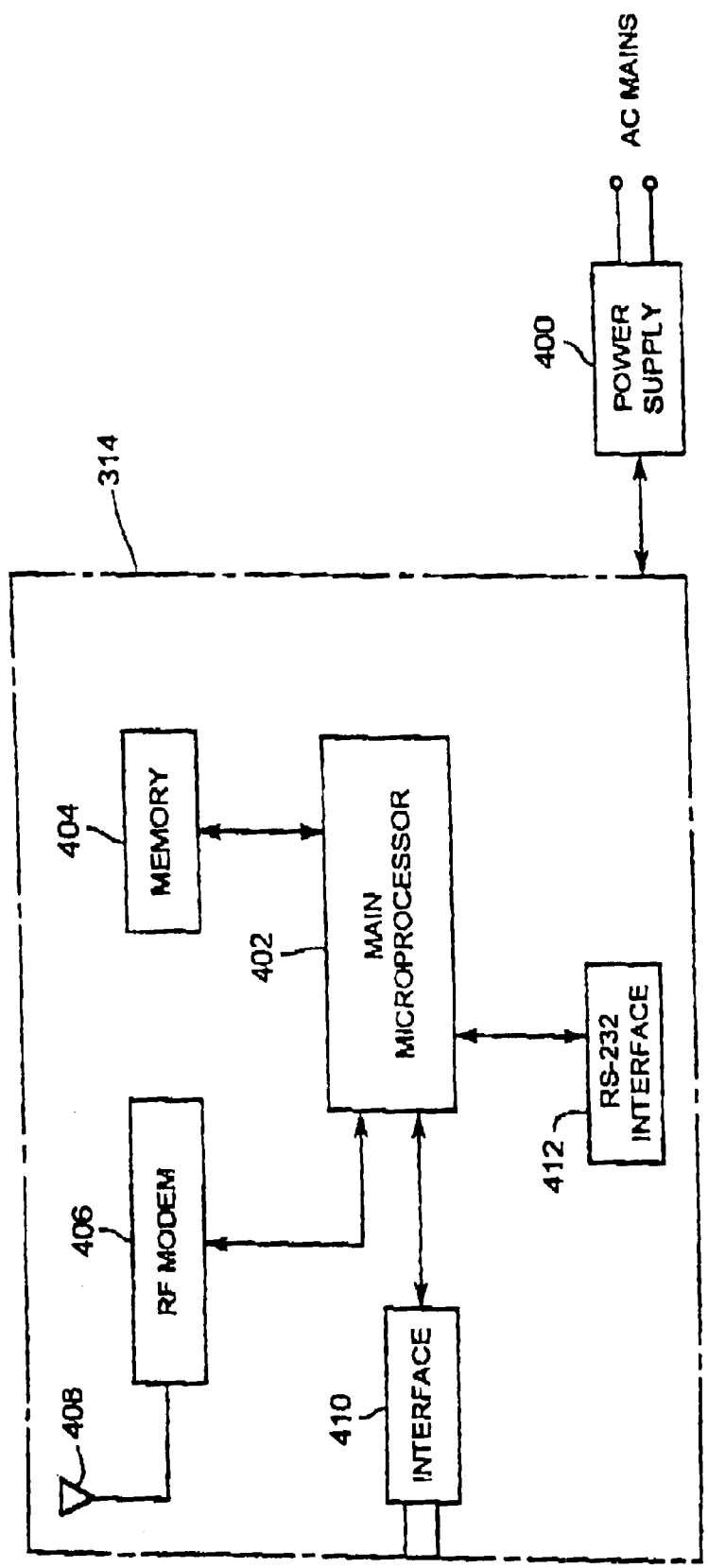
FIG. 14 is a schematic block diagram of a central network controller forming part of the cashierless checkout station of FIG. 13.

Referring now to FIGS. 13 and 14, one of the cashierless checkout stations 24 is shown. As can be seen, the checkout station includes a counter 300 to one side of a checkout aisle 302. A photosensor 303 is accommodated by the counter 300 to detect the presence of a shopping cart 210 at the checkout station 24. A lifting unit 304 having a pair of extendible arms to engage and lift a hopper 214 from a shopping cart undercarriage 212 is provided in the side of the counter 300 and is responsive to the photosensor 303. A load cell 306 is associated with the lifting unit 304 to detect the weight of the lifted hopper. An RF communications module 308 is responsive to the load cell 306 to transmit hopper weight information to the RF shopping terminal 34 on the shopping cart. A gate 310 having a moveable arm 312 is responsive to a central network controller 314 (see FIG. 14) and an RF shopping terminal return docking port 316 and moves to an open condition after the items have been purchased by the shopper and the RF shopping terminal 34 is returned to the docking port. A printer 318 prints a receipt for the shopper to sign acknowledging the verification of the financial transaction.

Referring now to FIG. 14, the central network controller 314 is better illustrated. As can be seen, the central controller 314 is powered by a power supply 400 connected to AC mains. The central network controller 314 includes a CPU motherboard with a main microprocessor 402 and associated memory 404. The main microprocessor 402 is connected to an RF modem 406 having an antenna 408 for establishing an RF communications link with the RF shopping terminals 34. An interface 410 to DATAPAC 3101 and 3201 and other data link protocols is connected to the main microprocessor to allow the controller 314 to access dial-up leased telephone lines. An ISDN board may optionally be provided. A serial RS232 interface 412 is connected to the main microprocessor 402 to allow updates to software used by the controller 314 to be downloaded.

The central network controller 314 functions as a gateway between the RF shopping terminals 34 and the network interface leading to a host computer at a financial institution. The central network controller 314 forms a transparent link for financial transaction requests generated by the RF shopping terminals. In particular, the central network controller 314 collects financial transaction requests from the individual RF shopping terminals 34 when a shopper wishes to pay for selected items and forwards them to the host computers at the appropriate financial institutions. Specifics of the central controller initialization and communications protocol can be found in PCT Application Serial No. PCT/CA96/00104 filed on Feb. 22, 1996 and published under No. WO 96/26505 on Aug. 29, 1996.

Shopping in the grocery store and the operation of the components therein will now be described. When a shopper enters the grocery store 10, the shopper passes through one of the one-way entrances 12. After passing through the entrance, the shopper proceeds to the RF shopping terminal charging bank 30. Once at the RF shopping terminal charging bank 30, the shopper inserts their credit, debit or smart card into the card reader 56. The card reader in turn reads the inserted card and conveys the read card data to the controller 52. The controller 52 examines the read card data to check the validity of the read card and whether the read card carries the required preset minimum amount of funds.

If the read card is valid and carries at least the preset minimum amount of funds, the controller 52 actuates the locking mechanism associated with the holder 32 in the RF shopping terminal charging bank which holds the most charged RF shopping terminal 34. Once actuated, the locking mechanism retracts the locking pins 48 so that they move out of the holes in the locking plates 120 allowing the RE shopping terminal 34 to be lifted out of the holder 32. At the same time, the controller 52 causes the LED 42 associated with that holder 32 to flash and sounds the sound generator 44 causing it to beep. In this manner, the shopper is notified of the position of the RF shopping terminal 34 to be removed from the RF shopping terminal charging bank 30.

After the shopper has taken the RF shopping terminal 34, the shopper selects a shopping cart 210 and snaps the RF shopping terminal 34 into the pocket 260 of the holder 240 on the handle 232. The locking pins on the internal sidewalls of the pocket extend into the holes 122 in the locking plates 120 to inhibit accidental removal of the RF shopping terminal 34 from the holder. The shopper then places bags 248 into one or more of the compartments 244 in the hopper 214 and clips opposed sides of the bags to the internal walls 246 via the clasps 252 to maintain the bags open. The shopper is then ready to shop by walking along the aisles 18 and selecting items to be purchased.

When an item is to be purchased, the shopper scan the bar code on the item using the laser bar code scanner 126 before placing the item into the desired bag within the hopper 214. Once the item has been placed into the hopper, the load cell 216 beneath the hopper detects the increase in the weight of the hopper. The load cell 216 in turn transmits this weight information to the RF shopping terminal 34 which compares the weight information received from the load cell with the item weight information read from the bar code on the item. If the comparison does not correlate, the RF shopping terminal transmits an alarm signal to the controller 52 which in turn sounds an alarm. If the comparison correlates, the shopper simply continues shopping.

If the shopper changes their mind and wishes to return a scanned item back onto a shelf 16, the shopper removes the item from the hopper. When this is done, the load cell 216 detects the decrease in weight of the hopper and transmits the weight information to the RF shopping terminal. Once the weight information has been received from the load cell, the RF shopping terminal 34 starts a timer. The shopper is then required to scan the bar code of the item to be returned before the timer expires by pressing a return item command key on the keypad 106 and scanning the bar code via the laser bar code scanner 126. If the item weight information in the scanned bar code correlates with the weight information received from the load cell 216 and the timer has not expired, the timer is stopped and the shopper can continue shopping. If the weight information in the scanned bar code does not correlate with the weight information received from the load cell or if the timer expires before the bar code is scanned, the RF shopping terminal 34 transmits an alarm signal to the controller 52 which in turn sounds the alarm. As will be appreciated, by monitoring items placed into and removed from the hopper 214 by scanning the bar codes on the items and detecting the change in weight of the hopper, the RF shopping terminal is able to detect if items scanned by the laser bar code scanner 126 are different than items placed into and removed from the hopper.

When the shopper has finished shopping, the shopper wheels the shopping cart 210 to one of cashierless checkout stations 24. The shopping cart is positioned in the aisle 302 so that the hopper 214 is in front of the lifting unit 304 and detected by the photosensor 303. Once detected, the lifting unit extends the arms and lifts the hopper. The load cell 306 in turn detects the weight of the hopper and conveys the weight information to the RF shopping terminal 34. The RF shopping terminal compares the received total item weight information with the accumulated weight information calculated from the read bar codes. If the weight information correlates, the RF shopping terminal prompts the user to enter a debit, credit or smart card into the card reader 108. Otherwise, the RF shopping terminal transmits an alarm signal to the controller 52 which in turn sounds the alarm.

Once the debit, credit or smart card is inserted and read by the card reader 108, the RF shopping terminal prompts the shopper to enter a PIN or password using the input keypad 106. The RF shopping terminal does not display the entered PIN or password and encrypts the entered data to inhibit the data from being accessed by unauthorized parties. The RF shopping terminal 34 then generates a financial transaction request which includes the entered PIN or password together with total purchase price of the items scanned into the RF shopping terminal. The financial transaction request generated by the RF shopping terminal is then transmitted to the central network controller 314 via an RF communications link.

The central network controller 310 receives the financial transaction request and establishes a link to a financial institution via the interface 310. Once the link is established, the financial transaction request is relayed to the financial institution so that the transaction request can be verified and processed. Once processed and approved, the financial institution conveys a verification to the central network controller 314 which in turn transmits the verification to the printer 318 so that a receipt is printed to confirm that the financial transaction has been verified and processed. The central network controller also provides input to the gate 310 so that when the RF shopping terminal 34 is placed in the return docking port 316, the arm 312 of the gate is retracted allowing the shopper to wheel the shopping cart 210 through the checkout station 214. The bags 248 of items can then be lifted from the hopper 214 and the shopping cart can be returned to the storage area 200 before the shopper exits the grocery store 10 via one of the exits 14.

As will be appreciated, the cashierless shopping store allows a shopper to purchase items without the need for a cashier to handle and bag the purchased items. Thus, as the shopper shops, items to be purchased can be sorted and bagged "on the go" avoiding item damage from occurring.

Although a preferred embodiment of the present invention has been described, those of skill in the art will appreciate that variations and modification may be made thereto without departing from the spirit and scope thereof as defined by the appended claims.

What is claimed is:

1. A cashierless shopping store composing:
   at least one shopping cart into which items to be purchased are placed, said at least one shopping cart including means to detect the weight of items placed therein and means to transmit detected item weight information over a wireless communication link;
   at least one portable wireless shopping terminal to accompany said at least one shopping cart and receiving item price and weight information read from items to be purchased prior to placement in said shopping cart, said at least one shopping terminal also receiving the weight information transmitted over said wireless communication link and comparing the read item and transmitted weight information to determine if said weights correlate; and
   at least one checkout station including means to detect the total weight of items in said at least one shopping cart and means to transmit detected total weight information over said wireless communication link to said at least one shopping terminal, said at least one shopping terminal comparing the transmitted total weight with the sum of read item weights to determine if said total and sum weights correlate.

2. A shopping store as defined in claim 1 further comprising a central controller in communication with said at least one shopping terminal over said wireless communication link, said central controller receiving a financial transaction request from said at least one shopping terminal and transmitting said request to a financial institution for approval.

3. A shopping store as defined in claim 2 wherein said at least one shopping terminal signals said central controller when said weights do not correlate, said central controller initiating an alarm in response to said signals.

4. A method of shopping for items comprising the steps of:
   scanning item price and weight data from selected items to be purchased using a portable shopping terminal;
   placing said selected items into a shopping cart;
   detecting the weight of each selected item as each selected item is placed in said shopping cart;
   transmitting the weight of each selected item over a wireless communication link to said shopping terminal;
   in the shopping terminal, comparing the scanned weight data for each selected item with the received detected weight to determine if the scanned weight data and received detected weight correlate;
   measuring the total weight of selected items placed in said shopping cart and transmitting the measured total weight over a wireless communications link to said shopping terminal; and
   in the shopping terminal, comparing the measured total weight with the sum of all of the weight data scanned from said selected items.

5. The method of claim 4 further comprising the step of sounding an alarm if either of said comparisons do not correlate.

6. The method of claim 5 further comprising the step of generating a financial transaction request based on item price data scanned from said selected items.

7. A shopping cart comprising:
   a wheeled carriage;
   a hopper removably supported on said carriage into which items to be purchased are placed, said hopper being partitioned into a plurality of compartments, each of said compartments for receiving a bag into which items may be placed during shopping;
   a weight sensor to detect the weight of items placed in said hopper, said weight sensor including a load cell on said wheeled carriage and on which said hopper rests; and
   a wireless communication module responsive to said load cell to transmit detected weight information over a wireless communication link.

8. A cashierless shopping store comprising:
   a plurality of shopping carts into which selected items to be purchased are placed by shoppers, each of said shopping carts including a weight detector to measure the weight of items placed therein and a transmitter to transmit the measured weight over a wireless communications link;
   a portable wireless shopping terminal accompanying each of said shopping carts, each shopping terminal reading item price and item weight data from each selected item to be purchased and receiving the measured weight of each selected item transmitted over said wireless communications link by said transmitter, said shopping terminal comparing the read item weight data with the transmitted measured weight to determine if the read item weight data and transmitted measured weight for each selected item correlate; and
   at least one checkout station including a scale to measure the total weight of selected items in a shopping cart and a transmitter to transmit the measured total weight over said wireless communications link to the shopping terminal accompanying that shopping cart, said shopping terminal comparing the measured total weight with the sum of the read item weight data to determine if said weights correlate.

9. A cashierless shopping store according to claim 8 wherein each shopping terminal includes a scanner to read said item price and item weight data from each selected item.

10. A cashierless shopping store according to claim 9 wherein said scanner is a bar code scanner.

11. A cashierless shopping store according to claim 9 wherein each shopping terminal includes a card reader to receive a payment card to be used to pay for selected items, said shopping terminal generating a financial transaction request based on the sum of read item price data.

12. A cashierless shopping store according to claim 11 wherein said at least one checkout station includes a gate actuable from a closed to an open position when said financial transaction request is approved.

13. A cashierless shopping store according to claim 11 wherein an alarm is sounded if said read item weight data and transmitted measured weight do not correlate and/or if said measured total weight and the sum of the read item weight data do not correlate.

14. A cashierless shopping store according to claim 13 wherein each shopping terminal further includes a display for displaying pricing information transmitted over said wireless communications link.

15. A cashierless shopping store according to claim 13 further comprising a charging bank accommodating shopping terminals and recharging the same, each shopping terminal being removable from said charging bank to accompany a shopping cart.

16. A cashierless shopping store according to claim 15 wherein each shopping cart includes a holder for said shopping terminal.

17. A cashierless shopping store according to claim 16 wherein said charging bank includes a card reader to read payment cards, said charging bank releasing a shopping terminal when a valid payment card is read.

18. A cashierless shopping store according to claim 17 wherein said charging bank releases the most charged shopping terminal when a valid payment card is read.

19. A cashierless shopping store according to claim 18 wherein said at least one checkout station includes a gate actuable from a closed to an open position when said financial transaction request is approved.

* * * * *